United States Patent [19]

Gokimoto et al.

[11] Patent Number: 4,484,776
[45] Date of Patent: Nov. 27, 1984

[54] AUTOMOBILE SEAT

[75] Inventors: Hiroyuki Gokimoto; Isao Kiyomitsu, both of Hiroshima, Japan

[73] Assignee: Mazda Motor Corporation, Japan

[21] Appl. No.: 409,926

[22] Filed: Aug. 20, 1982

[30] Foreign Application Priority Data

Aug. 26, 1981 [JP] Japan .................................. 56-1338719
Sep. 1, 1981 [JP] Japan .................................. 56-137460
Sep. 4, 1981 [JP] Japan .................................. 56-140062

[51] Int. Cl.³ .............................................. B60N 1/02
[52] U.S. Cl. .................................... 296/65 R; 297/379
[58] Field of Search ............. 296/65 R; 297/379, 335, 297/336, 366

[56] References Cited

U.S. PATENT DOCUMENTS

| | | | |
|---|---|---|---|
| 3,695,688 | 10/1972 | Wize | 297/379 |
| 3,957,312 | 5/1976 | Bonnaud | 297/366 |
| 4,124,250 | 11/1978 | Weinich | 297/379 |
| 4,194,782 | 3/1980 | Itoh | 296/65 R |
| 4,268,086 | 5/1981 | Okuyama | 296/379 |

Primary Examiner—Robert R. Song
Attorney, Agent, or Firm—Gerald J. Ferguson, Jr.; Joseph J. Baker

[57] ABSTRACT

An automobile seat comprising a seat bottom rotatable around a transverse axis approximately parallel to a car body floor, a seat back mounted on the seat bottom and capable of being inclined forwards, a seat bottom lock for releasably locking the seat bottom to the floor, a seat back lock for releasably locking the seat back to the seat bottom, and a lock releasing and linking mechanism for linking the forward inclination of the seat back and the rotation of the seat bottom to each other so as to conduct both seat back forward inclination and seat bottom rotation by a single operation. The lock releasing and linking mechanism is provided with an actuation piece for detecting the rotation of the seat bottom and a drive member for releasing the seat back lock by the actuation of the actuation member. Or, the mechanism is provided with an interlocking member for releasing the seat bottom lock in a manner interlocked with the forward inclination of the seat back.

27 Claims, 15 Drawing Figures

AUTOMOBILE SEAT

BACKGROUND OF THE INVENTION

1. Field of the Invention

This invention relates to an automobile seat, and more particularly to an improvement of an automobile seat the seat back of which can be inclined forwards with respect to the seat bottom and stored together with the seat bottom in front of the original position of the seat bottom.

2. Description of the Prior Art

In multipurpose one-box cars and vans used, for example, for carrying persons and goods, the seats are formed so that they can be stored in folded condition to make available large spaces for loading cargo. In general, to obtain a larger space for cargo, the seat back for supporting the back of a person is inclined forwards on the seat bottom and then the seat bottom supporting the inclined seat back is rotated forwards and stored together with the seat back so as to leave a wide space behind the seat. The automobile seat of this type is widely used. However, to fold and store the conventional automobile seat comprising the forward-rotating type seat bottom, a seat back lock for releasably locking the seat back to the seat bottom must first be released to incline the seat back forwards, and then a seat bottom lock for releasably locking the seat bottom to the floor of the car body must be released to rotate the seat bottom forwards. Namely, it is necessary to perform two lock releasing operations to incline the seat back forwards and to rotate the seat bottom forwards. Thus, the operations for folding and storing the conventional seat comprising the forward-rotating type seat bottom are very troublesome.

SUMMARY OF THE INVENTION

The primary object of the present invention is to provide an improved automobile seat having a forward-rotating type seat bottom.

Another object of the present invention is to provide an automobile seat capable of being rotated forwards and stored very easily to obtain a large space behind the seat.

The specific object of the present invention is to provide an automobile seat having a simple configuration, in which both forward inclination of the seat back and forward rotation of the seat bottom can be achieved by one operation.

The automobile seat in accordance with the present invention comprises a seat bottom rotatable around a transverse axis approximately parallel to the floor, a seat back mounted on said seat bottom so that the seat back can be inclined forwards, a seat bottom lock for releasably locking said seat bottom to said floor, a seat back lock for releasably locking said seat back to said seat bottom, and a lock releasing and linking mechanism for linking the forward inclination of said seat back and the rotation of said seat bottom to each other so as to conduct both seat back forward inclination and seat bottom rotation by a single operation. In the present invention, the automobile seat is provided with the lock releasing and linking mechanism for linking the forward inclination of the seat back and the rotation of said seat bottom to each other. Accordingly, when the seat back is inclined forwards or the seat bottom is rotated by the operator, the other operation i.e. the rotation of the seat bottom or the forward inclination of the seat back occurs automatically. In this way, the forward inclination of the seat back and the forward rotation of the seat bottom can be achieved by one operation, and the seat can easily be stored in front of its original position to leave a wide space behind the stored seat.

In the present invention, the lock releasing and linking mechanism may be formed so that the seat bottom lock is released automatically when the seat back lock is released by inclining the seat back forwards. Alternatively, the linking mechanism may be formed so that the seat back lock is released automatically when the seat bottom lock is released or the seat bottom is rotated.

DESCRIPTION OF THE PREFERRED EMBODIMENTS

The present invention will hereinbelow be described in further detail with reference to the accompanying drawings.

Figure 1:
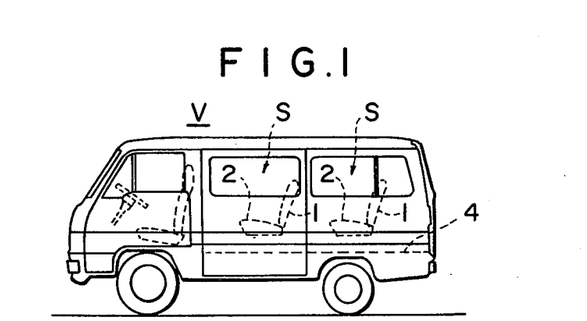
FIG. 1 is a side view showing an ordinary one-box car.

FIG. 1 shows a one-box car or van of the type in general use for various purposes, for example, for carrying persons and goods. In FIG. 1, a one-box car V contains rear seats S comprising seat backs 1 and seat bottoms 2. When a large cargo is loaded in the one-box car V, the seat backs 1 are inclined forwards on the seat bottoms 2 and the seat bottoms 2 are then rotated forwards and stored in front of their original positions to obtain large spaces behind them. Reference numeral 4 designates the floor of the car body on which the seat bottoms 2 are supported.

Figure 2:
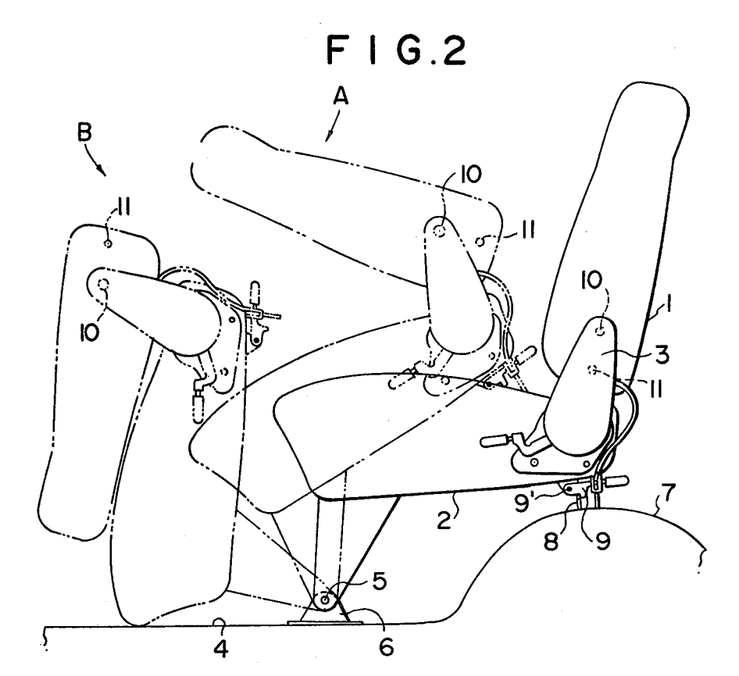
FIG. 2 is a side view showing an embodiment of the automobile seat in accordance with the present invention.

FIG. 2 shows an embodiment of the automobile seat in accordance with the present invention. The seat is used for example as the rear seat in a one-box car. Like a conventional seat of this type, the seat shown in FIG. 2 comprises a seat back 1, a seat bottom 2, an upper bracket 3 mounted on the seat bottom 2 to support the seat back 1, a support 6 for supporting the seat bottom 2 for rotation around a pivot 5 parallel to the floor 4, and a lock piece 9 for releasably locking the seat bottom 2 to a U-shaped striker 8 erected on a tire house 7 constituting part of the floor 4. The lock piece 9 is rotated around a pin 9' to be engaged with and disengaged from the striker 8. The seat back 1 can be rotated around a shaft 10 supported by the upper bracket 3. When the seat is used for seating purposes, a lock pin 11 is engaged with a hook (not shown in FIG. 2) supported in the interior of the upper bracket 3, whereby the seat back 1 is fixed to the upper bracket 3. As in the case of the conventional forward-rotating type seat, when the lock pin 11 is disengaged from the hook, the seat back 1 becomes free and can be rotated around the shaft 10 and completely folded forwards with respect to the seat bottom 2. Accordingly, when the seat back 1 is completely folded forwards and the seat bottom 2 is rotated forwards around the pivot 5 after disengaging the lock piece 9 from the striker 8, the seat can be stored in the position generally indicated by reference character B via a position A indicated by the two-dot chain line in FIG. 2.

Unlike the conventional forward-rotating type seat, however, the lock pin 11 shown in FIG. 2 automatically disengages from the hook of the upper bracket 3 when the seat bottom 2 is rotated. The configuration for achieving the automatic unlocking of the lock pin 11 is hereinafter described in detail with reference to FIGS. 3A to 4.

Figure 3A:
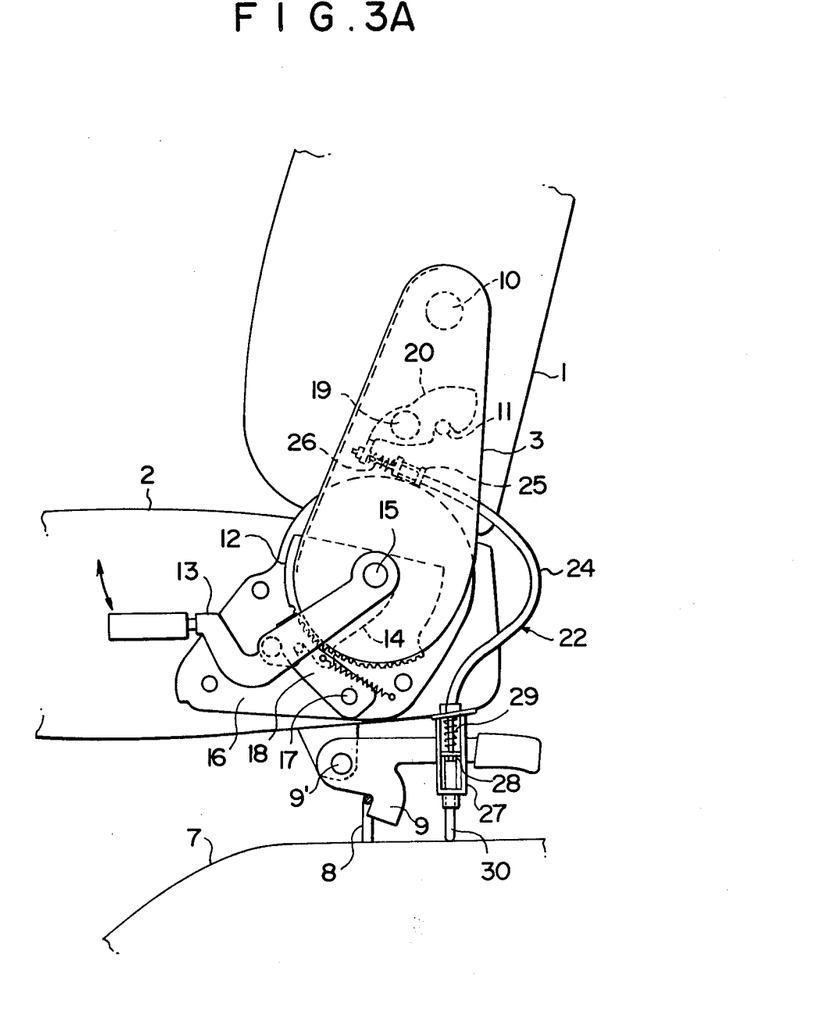
FIGS. 3A and 3B are enlarged side views showing part of the seat shown in FIG. 2.

FIG. 3A is an enlarged view showing the section coupling the seat back 1 and the seat bottom 2 of the seat shown in FIG. 2. In this embodiment, the seat is of the reclining type and the upper bracket 3 serves as the knuckle bracket for fixing a sector 12 constituting a reclining knuckle lock mechanism. A reclining control lever 13 has a lever 14 fixed thereto, and can rotate around a shaft 15 with respect to the upper bracket 3. To the seat bottom 2 is fixed a lower bracket 16, on which a lock gear 18 is supported for rotation around a shaft 17. When the reclining control lever 13 is pulled up in FIG. 3A, the lock gear 18 is constrained by the lever 14 to disengage from the sector 12. In this condition, when the angle of the seat back 1 is adjusted and the reclining control lever 13 is released, the lock gear 18 is urged by a spring to engage with the sector 12 and maintain the seat back 1 at the adjusted angle as in the case of the reclining mechanism known in the art. As shown in detail in FIG. 4, a hook 20 is mounted in the interior of the upper bracket 3 so that the hook 20 can rotate around a pin 19. To a protrusion 21 at the lower section of the hook 20 is fixed one end of an inner wire 23 of a cable 22. The cable 22 consists of the inner wire 23 and an outer tube 24 through which the inner wire 23 is moved. The inner wire 23 can freely be moved longitudinally in the outer tube 24, which is clamped to a clamp 25 fixed to the upper bracket 3. Between the clamp 25 and the protrusion 21 of the hook 20 is positioned a spring 26 for urging the hook 20 to turn in the direction of the arrow C around the pin 19. As shown in FIG. 3A, the other end of the outer tube 24 of the cable 22 is fixed to the top of a slider block 27 fixed to the bottom of the seat bottom 2. In the slider block 27 is positioned a slider 28 which slides therein in the vertical direction in FIG. 3A and which has the other end of the inner wire 23 fixed thereto. A spring 29 having a spring force larger than that of the spring 26 is positioned around the inner wire 23 between the slider 28 and the top of the slider block 27 to urge the slider 28 downwards. To the slider 28 is fixed a bar-like contact piece 30 which projects from the bottom of the slider block 27.

Figure 4:
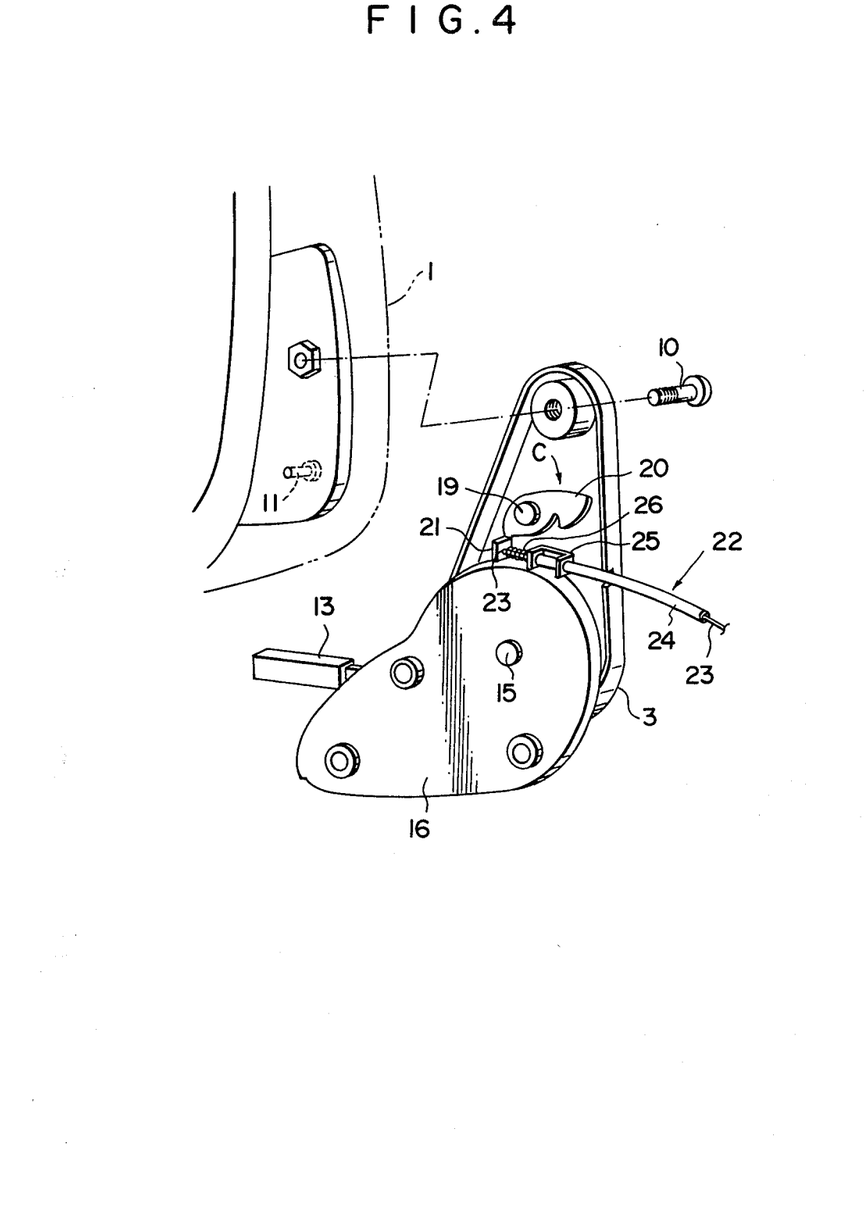
FIG. 4 is an enlarged perspective view showing part of the seat shown in FIG. 2.

Operations of the seat shown in FIGS. 2 to 4 are described below. When the seat is used for seating purposes, the lock piece 9 of the seat bottom 2 is engaged with the striker 8 as shown in FIG. 3A, and the seat bottom 2 is maintained in the position approximately parallel with the floor 4. The bottom section of the seat bottom 2 contacts a contacting section (not shown) of the car body, and the weights of the seat and the person seating thereon are supported by the contacting section of the car body. At this time, the lower tip of the contact piece 30 projecting downwards from the slider block 27 is in contact with the tire house 7 and pushed towards the interior of the slider block 27 against the force of the spring 29. When the contact piece 30 is pushed into the slider block 27, the slider 28 is pushed up and the inner wire 23 fixed to the slider 28 is moved up through the outer tube 24. As a result, the hook 20 is urged by the spring 26 to rotate clockwise in FIG. 3A around the pin 19 and engage with the lock pin 11 of the seat back 1. Accordingly, the seat back 1 is supported by the upper bracket 3 at two points, i.e. the lock pin 11 and the shaft 10, and cannot rotate with respect to the upper bracket 3. In this condition, it is of course possible to change the angle of inclination of the upper bracket 3 through the reclining mechanism described above and set the inclination angle of the seat back 1.

Figure 3B:
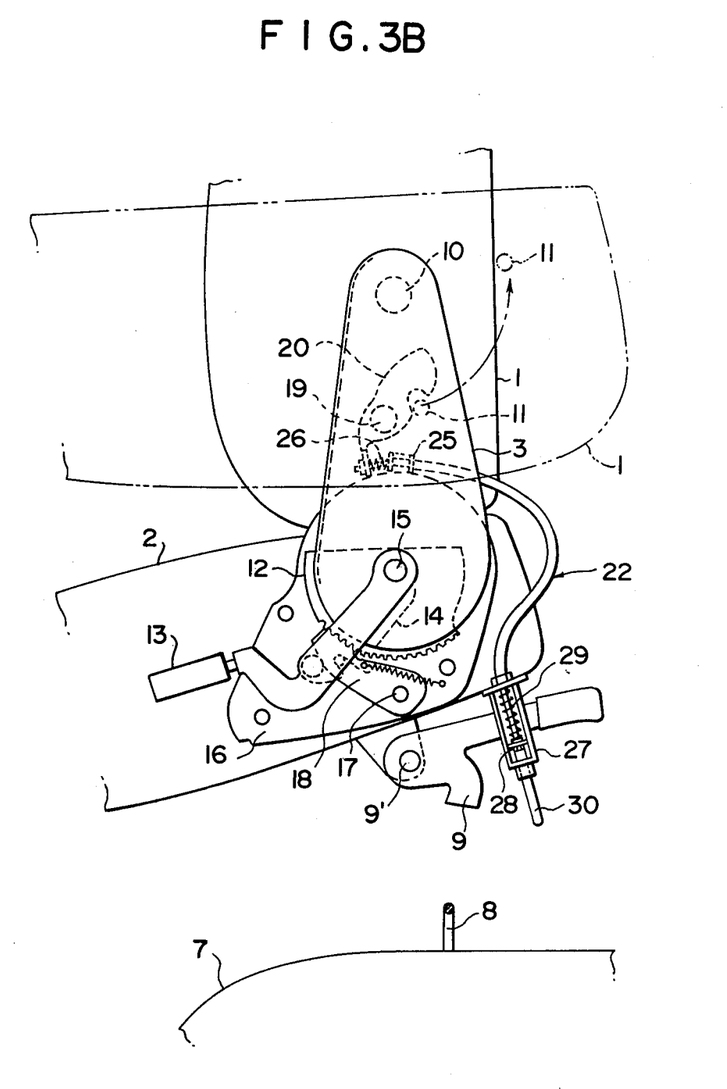

When the seat is stored in the forward position, the lock piece 9 is raised around the pin 9' in FIG. 3A and disengaged from the striker 8. Thereafter, when the seat bottom 2 is rotated counterclockwise around the pivot 5 as shown in FIG. 3B. The lower tip of the contact piece 30 separates from the tire house 7. Because the spring 29 has a larger force than the spring 26, the slider 28 is moved down by the spring 29, and the inner wire 23 is pulled down by the slider 28. As a result, the hook 20 is rotated counterclockwise by the inner wire 23 around the pin 19 as shown in FIG. 3B, and disengaged from the lock pin 11. In this condition, the seat back 1 can rotate around the shaft 10 with respect to the upper bracket 3 and be completely folded forwards with respect to the seat bottom 2 as indicated by the two-dot chain line in FIG. 3B. By further rotating the seat bottom 2 counterclockwise, the seat can be stored in front of its original position as shown in FIG. 2 to obtain a wide space behind the seat.

In the embodiment shown in FIGS. 2 to 4, when the seat bottom 2 is rotated to store the seat, the engagement between the seat back 1 and the upper bracket 3 is released automatically. Accordingly, the seat can be stored very easily simply by raising the lock piece 9 for locking the seat bottom 2 to the floor. Furthermore, after the lock piece 9 is disengaged from the striker 8 and the seat bottom 2 is raised, the unlocked condition between the seat back 1 and the upper bracket 3 is maintained by the spring force of the spring 29. Therefore, the seat back 1 is not engaged with the upper bracket 3 even if the pulling force of the operator is removed from the lock piece 9 and the lock piece 9 moves down. This feature is very advantageous because, after pulling the lock piece 9, the operator can release it and simply rotate the seat to store it.

Figure 5:
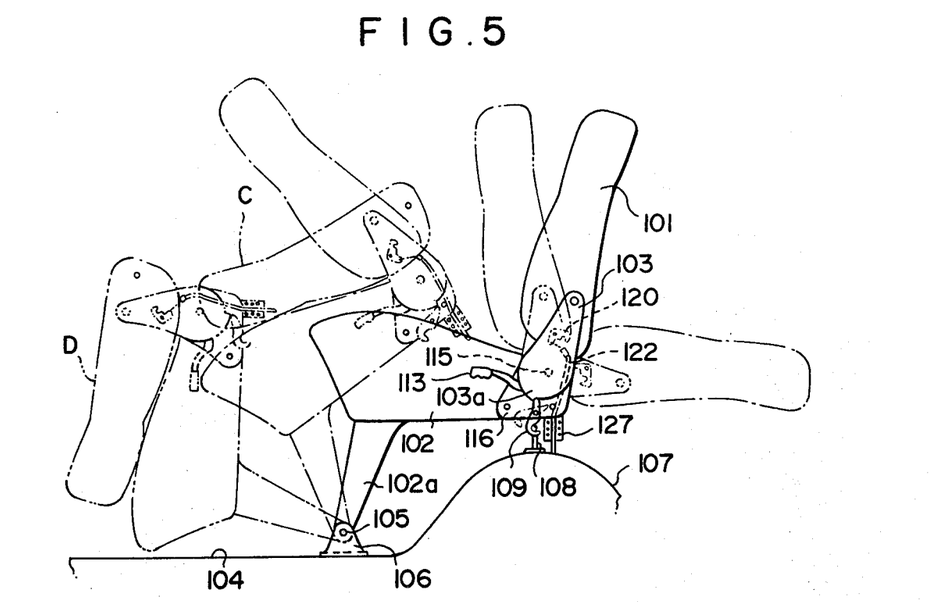
FIG. 5 is a side view showing another embodiment of the automobile seat in accordance with the present invention.
Figure 6:
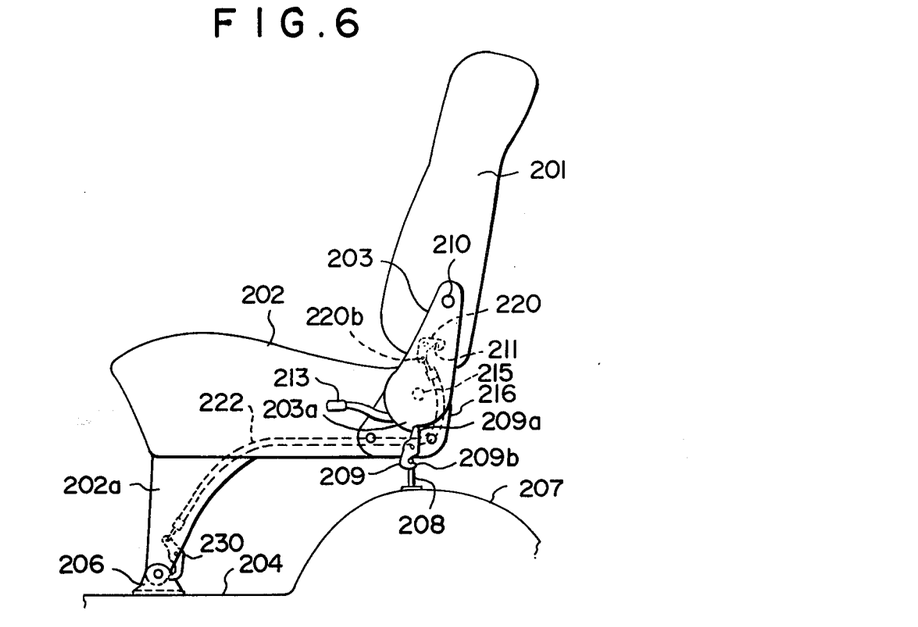
FIG. 6 is a side view showing a further embodiment of the automobile seat in accordance with the present invention.
Figure 7:
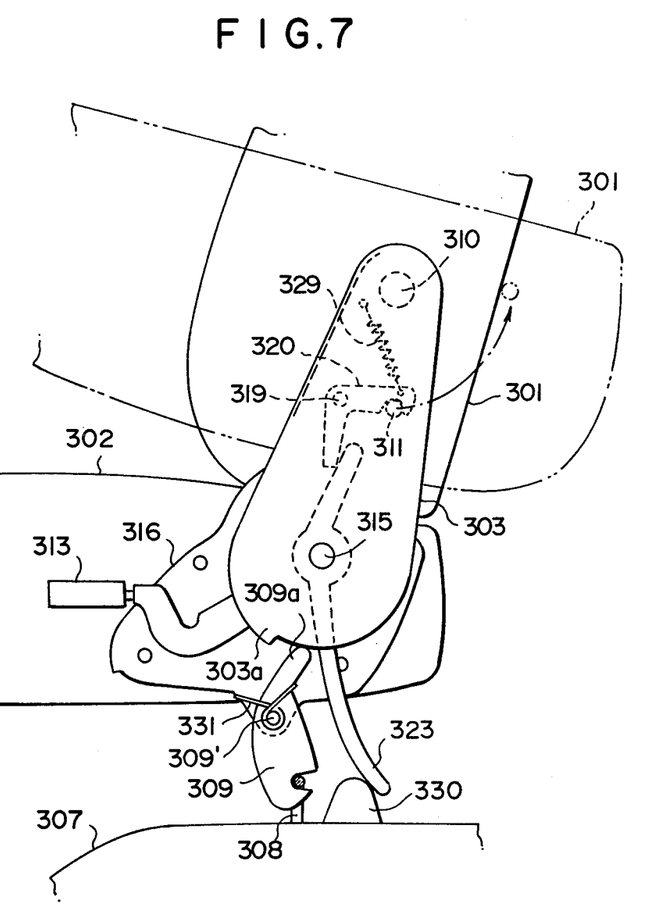
FIG. 7 is a side view showing a still further embodiment of the automobile seat in accordance with the present invention.

In the embodiment described above, the lock piece 9 is formed as an operating lever having a grip because, when the seat is stored, the lock piece 9 must be directly operated to release the lock between the seat bottom and the floor. However, when the present invention is applied to a reclining type seat, the lever for controlling the reclining mechanism may also serve to operate the seat bottom lock, thereby to reduce the number of the operating levers of the seat. FIGS. 5 to 7 show various embodiments of the automobile seat in accordance with the present invention, in which the lever for operating the seat bottom lock is omitted.

Figure 5A:
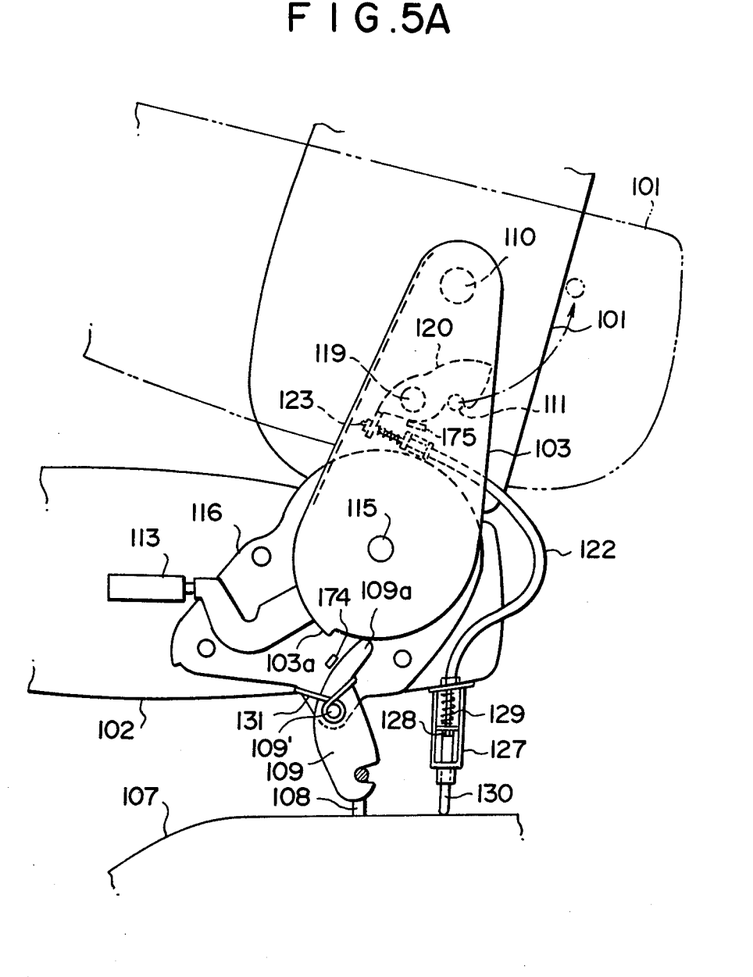
FIG. 5A is an enlarged side view showing part of the seat shown in FIG. 5.

FIG. 5 shows another embodiment of the seat in accordance with the present invention, in which the lever for operating the seat bottom lock is omitted, and FIG. 5A shows the coupling section between the seat back and the seat bottom shown in FIG. 5. Like the seat shown in FIG. 2, the seat shown in FIGS. 5 and 5A comprises a seat back 101, seat bottom 102, a lower bracket 116 fixed to the seat bottom 102, an upper bracket 103 rotatable around a shaft 115 with respect to the lower bracket 116, a shaft 110 around which the seat back 101 can be rotated with respect to the upper bracket 103, and a lock pin 111 fixed to the seat back 101. The seat back 101 is locked to the upper bracket 103 by a hook 120 which rotates around a pin 119 and engages with the lock pin 111. The engagement between the hook 120 and the lock pin 111 is released when the seat bottom 102 is rotated forwards to separate a contact piece 130 from a tire house 107. In this case, a slider 128 in a slider block 127 is pushed down by a spring 129, and an inner wire 123 is pulled down by the slider 128 to rotate the hook 120 counterclockwise around the pin 119. The parts described above and other sections are identical with those of the seat shown in FIG. 2. Likewise, the upper bracket 103 is supported on the lower bracket 116 via a reclining mechanism. However, the reclining mechanism is not shown in detail in FIGS. 5 and 5A (or in FIG. 6 and subsequent figures). On the bottom of the lower bracket 116 is mounted a lock piece 109 rotatable around a pin 109'. The lock piece 109 is urged counterclockwise around the pin 109' by a spring 131 applied to the pin 109'. Accordingly, when the seat bottom 102 is positioned horizontally to support a person, the lock piece 109 engages with a striker 108 fixed to the tire house 107 as shown. When the seat is stored to open a space behind it, a reclining control lever 113 is pulled up by the operator. As a result, the upper bracket 103 and the seat back 101 are rotated counterclockwise around the shaft 115 by a spiral spring (not shown) as in an ordinary reclining seat. The lower section of the upper bracket 103 is provided with a protrusion 103a, which pushes an upper end 109a of the lock piece 109 to the right when the upper bracket 103 is rotated counterclockwise as described above. In this way, the lock piece 109 is rotated clockwise around the pin 109' against the force of the spring 131, and disengaged from the striker 108 to make the seat bottom 102 free to rotate counterclockwise. The counterclockwise rotation of the seat bottom 102 results in the disengagement between the hook 120 and the lock pin 111 as already described above and, in this condition, the seat back 101 can be completely folded on the seat bottom 102 as indicated by the two-dot chain line D in FIG. 5. In FIG. 5A, reference numerals 174 and 175 designate stoppers for restricting the rotations of the lock piece 109 and the hook 120, respectively.

Like the seat shown in FIG. 2, the seat shown in FIGS. 5 and 5A is constructed so that the rotation of the seat bottom 102 is detected by the contact piece 130 which contacts the tire house 107. However, as shown in FIG. 6, the rotation of the seat bottom 202 may be detected by an arm 230 which engages with a support 206 for pivotably supporting the seat bottom 202 on a floor 204. The seat shown in FIG. 6, which is formed in the same way as that shown in FIG. 5 except for the section for detecting the rotation of the seat bottom 202, is provided with a seat back 201, a seat bottom 202, an upper bracket 203, a shaft 210 and a lock pin 211. When a reclining control lever 213 is pulled up by the operator, the upper bracket is rotated around a shaft 215, and a protrusion 203a at the lower section of the upper bracket 203 rotates a lock piece 209 to disengage the lock piece 209 from a striker 208 erected on a tire house 207.

Figure 6A:
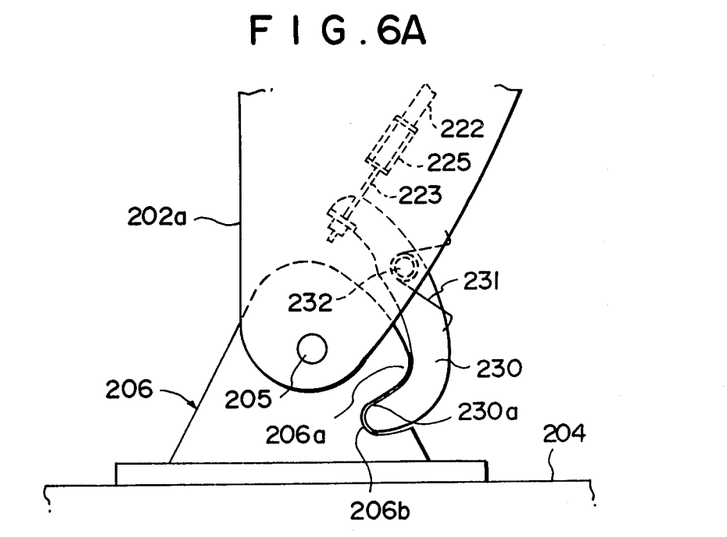
FIGS. 6A and 6B are enlarged side views showing part of the seat shown in FIG. 6.
Figure 6B:
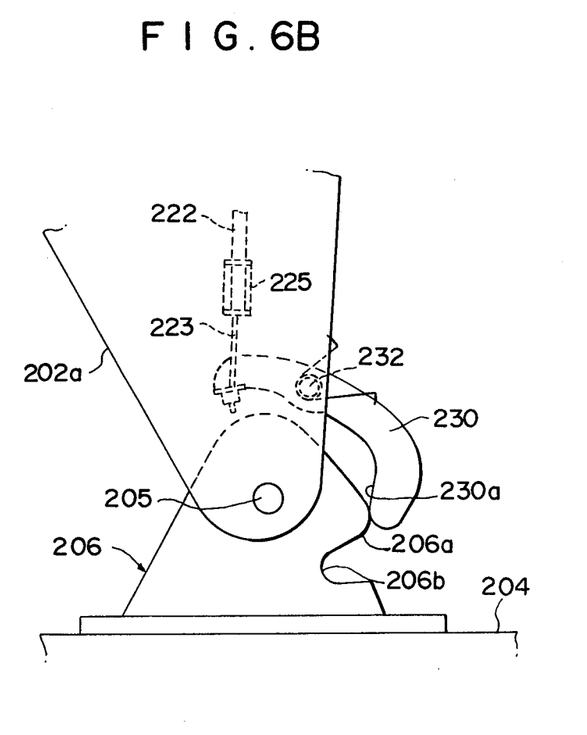

FIGS. 6A and 6B are enlarged side views showing the section for detecting the rotation of the seat bottom 202 of the seat shown in FIG. 6. As shown in FIG. 6A, on a leg 202a of the seat bottom 202 is mounted the curved arm 230 for rotation around a shaft 232. The arm 230 is urged clockwise around the shaft 232 by a spring 231 fitted on the shaft 232. As shown in FIG. 6A, when the seat is used for seating purposes, a curved end 230a of the arm 230 is engaged with a recess 206b of a support 206. When the lock piece 209 shown in FIG. 6 is disengaged from the striker 208 and the seat bottom 202 is rotated forwards around a pivot 205, the end 230a of the arm 230 is disengaged from the recess 206b of the support 206 and contacts a protrusion 206a of the support 206 as shown in FIG. 6B. Namely, the arm 230 is rotated counterclockwise around the shaft 232 against the force of the spring 231. As a result, an inner wire 223 connected to the arm 230 at one end is pulled down through a cable 222 fixed to a leg 202a by a clamp 225, and a hook (not shown) connected to the other end of the inner wire 223 is disengaged from the lock pin 211 shown in FIG. 6.

In the seats shown in FIGS. 5 to 6, the rotation of the seat bottom is transmitted to the seat back lock section by a cable consisting of the inner wire and the outer wire. However, the rotation of the seat bottom may be transmitted to the seat back lock section by other means. FIG. 7 shows an embodiment of the seat in accordance with the present invention, in which the rotation of the seat bottom is transmitted to the seat back lock section by a rotatable rod. In FIG. 7, the seat comprises a seat back 301, a seat bottom 302, an upper bracket 303, a lower bracket 316, a reclining control lever 313, a lock piece 309 rotatable around a pin 309', and a spring 331 for urging the lock piece 309 counterclockwise. All of these parts are formed in the same manner as those in FIG. 5. In the interior of the upper bracket 303 are positioned an L-shaped hook 320 rotatable around a pin 319 and a rod 323 rotatable around a shaft 315. The hook 320 is urged counterclockwise around the pin 319 by a spring 329. The upper end of the rod 323 can contact the lower end of the hook 320 to rotate the hook 320 against the spring 329, and the lower section of the rod 323 is curved towards the exterior of the seat bottom 302 and extends to a round protrusion 330 positioned on the upper surface of a tire house 307. When the seat is used for seating purpose, the lower end of the rod 323 contacts the round protrusion 330, and the upper end of the rod 323 causes the hook 320 to rotate clockwise around the pin 319 against the spring 329 and engage with the lock pin 311. When the reclining control lever 313 is pulled up to fold store away the seat, the upper bracket 303 is rotated and its protrusion 303a pushes an upper end 309a of the lock piece 309 to the right, resulting in the disengagement of the lock piece 309 from a striker 308. As the seat bottom 302 is rotated counterclockwise thereafter, the lower end of the rod 323 is separated from the protrusion 330, and the rod 323 becomes free to rotate around the shaft 315. Accordingly, the hook 320 can be rotated counterclockwise around the pin 319 by the spring 329 and disengaged from the lock pin 311. In this condition, the seat back 301 can be rotated around a shaft 310 and completely folded forwards on the seat bottom 302 as indicated by the two-dot chain line in FIG. 7.

Figure 8:
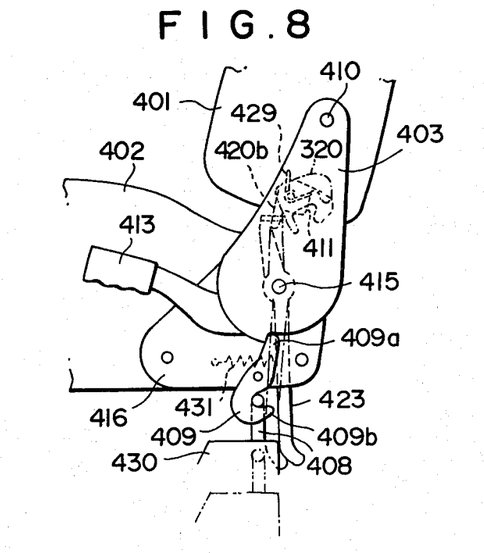
FIG. 8 is a side view showing an even further embodiment of the automobile seat in accordance with the present invention.

FIG. 8 shows another embodiment of the seat in accordance with the present invention, in which the rotation of the seat bottom is transmitted to the seat back lock section by a rotatable rod. Like the seat shown in FIG. 7, the seat shown in FIG. 8 is provided with a long rod 423 pivoted on a seat bottom 402. When the seat is used for seating purpose, the upper end of the rod 423 is engaged with the front side of a lower end 420b of a hook 320, and the lower end thereof with the rear side of a protrusion 430 on the floor of the car body. A spring 431 is positioned between a lower bracket 416 and an intermediate point of the lower section of the rod 423 below a shaft 415 and urges the lower end of the rod 423 to always contact the protrusion 430 on the floor. The hook 320 is urged by a spring 429 to always rotate clockwise and engage with a lock pin 411. When a reclining control lever 413 is pulled up to fold and store the seat, the reclining lock is released and a lock piece 409 is disengaged from a striker 408 as already described above. Thereafter, when the seat bottom 402 is rotated forwards, the hook 320 is disengaged from the lock pin 411 by the rod 423, and it becomes possible to rotate the seat back 401 around a shaft 410 and completely fold it onto the seat bottom 402.

In the embodiments shown in FIGS. 2 to 8, the engagement between the seat back and the upper bracket is released by detecting the rotation of the seat bottom. However, their engagement may be released by means of a linking mechanism which is directly interlocked with the movement of the lock means for releasing the engagement between the seat bottom and the floor. The linking mechanism used for this purpose can easily be formed by using a movement transmission mechanism known in the art.

Figure 9:
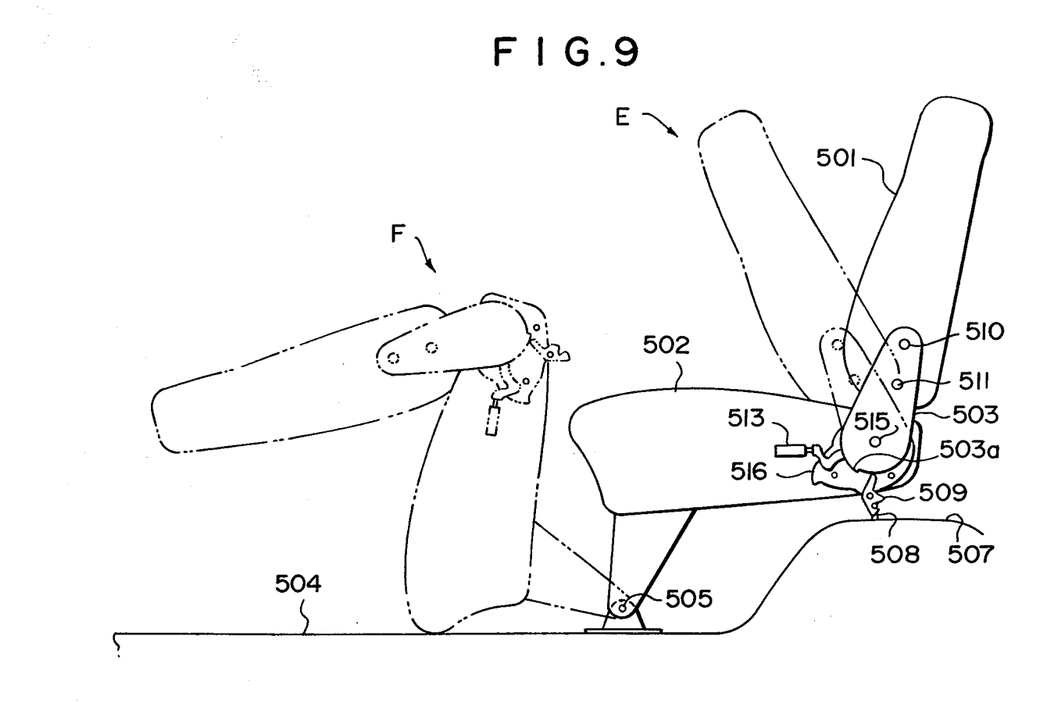
FIG. 9 is a side view showing an additional embodiment of the automobile seat in accordance with the present invention.
Figure 10:
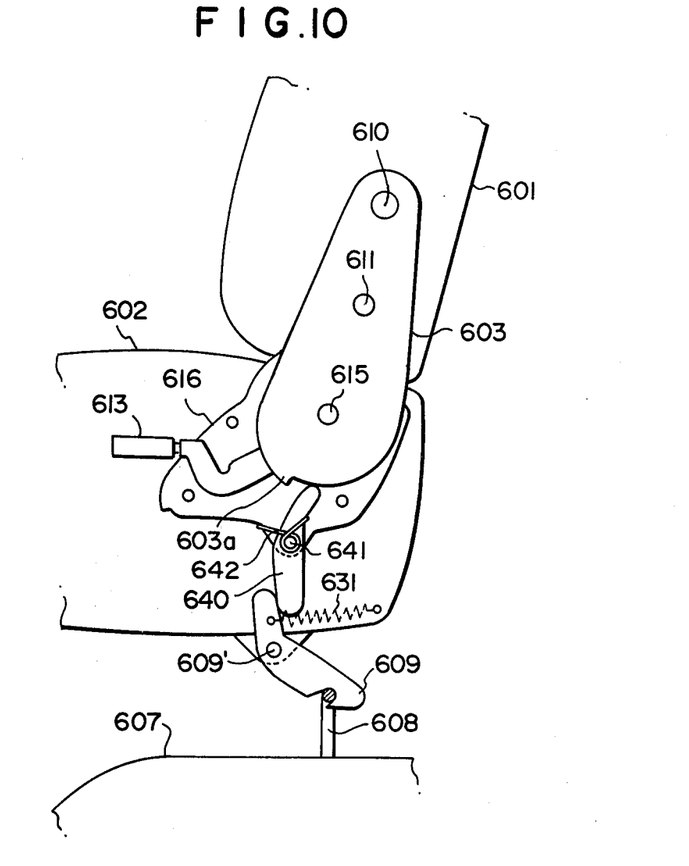
FIG. 10 is a side view showing another embodiment of the automobile seat in accordance with the present invention.
Figure 11:
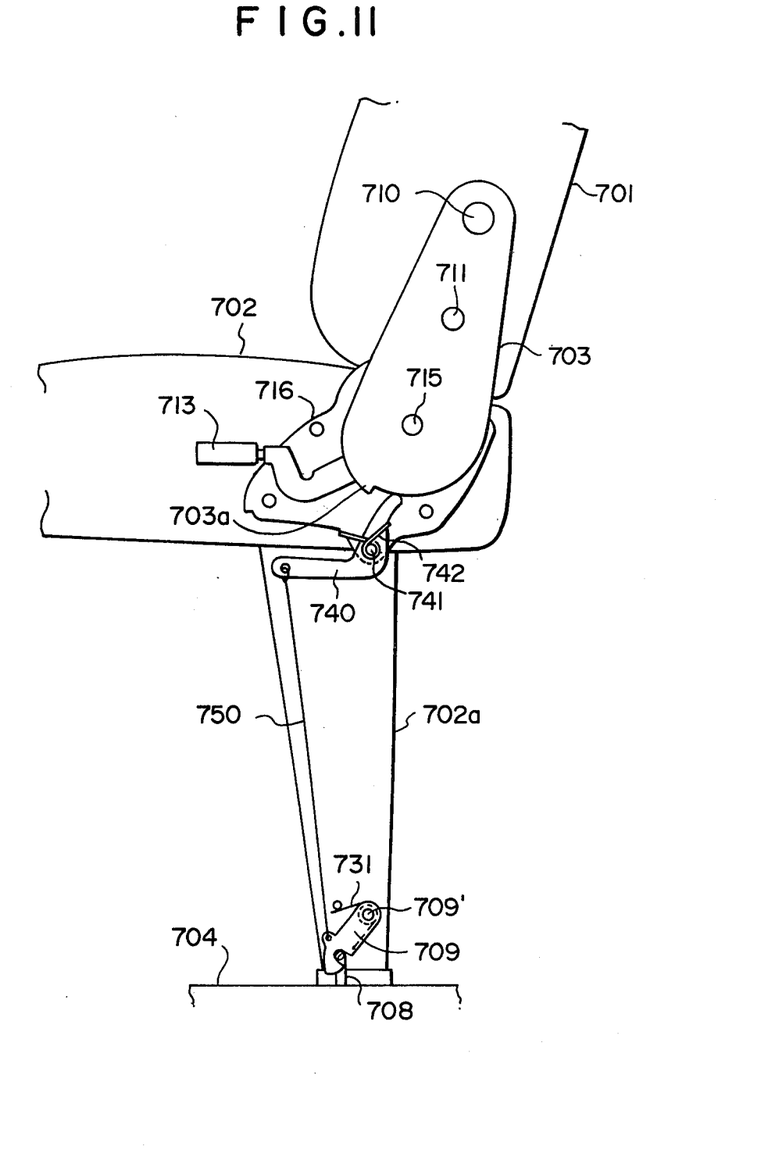
FIG. 11 is a side view showing another embodiment of the automobile seat in accordance with the present invention.

Furthermore, in case the seat is provided with a reclining mechanism, the seat back may be permanently fixed to the upper bracket so as to incline the seat back together with the upper bracket when the reclining lock is released. Namely, in the embodiments shown in FIGS. 2 to 8, the seat back may be fixed to the upper bracket, instead of releasably engaging the hook with the lock pin. In this case, the seat back cannot be completely folded on the seat bottom, but the mechanism for coupling the seat back with the seat bottom is simplified. In the seat of this type, because the upper bracket can be rotated when the reclining lock between the seat bottom and the upper bracket is released, i.e. when the lock between the seat bottom and the seat back is released, it is possible to form the seat so that the lock between the seat bottom and the floor is released in a manner interlocked with the rotation of the upper bracket. FIGS. 9 to 11 show various embodiments of the seat in accordance with the present invention, in which the seat back is permanently fixed to the upper bracket and the seat back can be inclined forwards together with the upper bracket by releasing the reclining lock.

In FIG. 9, when a reclining control lever 513 is pulled up, an upper bracket 503 is rotated counterclockwise around a shaft 515 with respect to a lower bracket 516 by a spiral spring (not shown), and a seat back 501 is inclined forwards (condition indicated by the two-dot chain line E) as already described with reference to FIG. 6. At this time, a protrusion 503a at the lower section of the upper bracket 503 pushes and rotates a lock piece 509 to disengage it from a striker 503a fixed to a tire house 507. Therefore, it becomes possible to rotate a seat bottom 502 forwards around a pivot 505 and store the seat on a floor 504. In the seat shown in FIG. 9, however, the seat back 501 is permanently fixed to the upper bracket 503 by two fixing pins 510 and 511, and the former cannot rotate with respect to the latter. Accordingly, the seat shown in FIG. 9 is not provided with the means for detecting the seat rotation and the means for releasing the lock between the seat back and the upper bracket, which are provided in the seat shown in FIG. 6. The seat back 501 is not completely folded forwards with respect to the seat bottom 502, but stored in the condition forwardly inclined by releasing the reclining lock.

If appropriate, depending on various conditions such as the shape of the seat bottom and the distance between the seat bottom and the floor of the car body, an intermediate member for transmitting movement may be positioned between the upper bracket and the seat bottom lock means. FIG. 10 shows an embodiment of the seat in accordance with the present invention in which such an intermediate member is provided. Like the seat shown in FIG. 9, the seat shown in FIG. 10 is provided with an upper bracket 603 rotatable around a shaft 615 with respect to a lower bracket 616 fixed to a seat bottom 602, and a seat back 601 is fixed to the upper bracket 603 by two fixing pins 610 and 611. On the bottom of the lower bracket 616 is mounted an intermediate lever 640 for rotation around a shaft 641. The intermediate lever 640 is urged counterclockwise around the shaft 641 by a spring 642 fitted on the shaft 641. On the lower section of the seat bottom 602 is mounted a lock piece 609 rotatable around a pin 609'. The lock piece 609 is urged clockwise around the pin 609' by a spring 631 and the upper end of the lock piece 609 can contact the lower end of the intermediate lever 640 as shown. When a reclining control lever 613 is pulled up to store the seat and the upper bracket 603 is inclined forwards around a shaft 615, a protrusion 603a at the lower section of the upper bracket 603 pushes the upper end of the intermediate lever 640 to right and rotates the intermediate lever 640 clockwise around the shaft 641. As a result, the lower end of the intermediate lever 640 pushes the upper end of the lock piece 609 to the left to rotate the lock piece 609 counterclockwise around the pin 609' against the spring 631 and disengage it from a striker 608 on a tire house 607. Because the seat back 601 is fixed to the upper bracket 603, the seat back 601 is inclined forwards together with the upper bracket 603.

FIG. 11 shows another embodiment of the seat in accordance with the present invention, in which an intermediate member for transmitting movement is positioned between the upper bracket and the seat bottom lock means. In FIG. 11, a seat bottom 702 is provided with a rear leg 702a, and the movement of an upper bracket 703 is transmitted to a lock piece 709 at the bottom of the rear leg 702a via a long wire 750. Like the seats shown in FIGS. 9 and 10, the upper bracket 703 is rotatable around a shaft 715 with respect to a lower bracket 716 fixed to the seat bottom 702, and a seat back 701 is fixed to the upper bracket 703 by two fixing pins 710 and 711. On the lower section of the lower bracket 716 is mounted an L-shaped intermediate lever 740 for rotation around a shaft 741. The intermediate lever 740 is urged counterclockwise around a shaft 741 by a spring 742 applied to the shaft 741. The seat bottom 702 is provided with the rear leg 702a in addition to a front leg having a pivot (not shown). On the lower section of the rear leg 702a is mounted the lock piece 709 for rotation around a pin 709'. The lock piece 709 is urged counterclockwise around the pin 709' by a spring 731 fitted on the pin 709', and connected to the intermediate lever 740 by the long wire 750 as shown. When the seat is used for seating purposes, the lock piece 709 is maintained in engagement with a striker 708 on a floor 704 by the spring 731 to lock the seat to the floor 704. When a reclining control lever 713 is pulled up to store the seat and the upper bracket 703 is inclined forwards around the shaft 715, a protrusion 703a at the lower section of the upper bracket 703 pushes the upper end of the intermediate lever 740 to the right and rotates it clockwise around the shaft 741. As a result, the wire 750 is pulled up by the intermediate lever 740, and the lock piece 709 is rotated clockwise against the spring 731 and disengaged from the striker 708.

In the embodiments described above, the seat is referred to as being of the reclining type. However, the present invention can also be applied to a seat in which the angle of the seat back is fixed. In such a seat, because the seat back cannot be inclined forwards by releasing the reclining lock as in the seats shown in FIGS. 9 to 11, it is necessary to form the seat so that the seat back can be inclined with respect to the upper bracket, for example, by using the hook and the lock pin as in the seats shown in FIGS. 2 to 8. Furthermore, as the linking mechanism for linking the release of the seat back lock and the rotation of the seat bottom, the mechanism comprising the cable, the upper bracket provided with a protrusion contacting the lock piece, the intermediate lever or wire as described above may be replaced by a hydraulic means or an electrical means.

We claim:

1. An automobile seat comprising a seat bottom rotatable around a transverse axis approximately parallel to a floor up to a position where the rear portion of the seat bottom is free from the floor, a seat back mounted on said seat bottom so that the seat back can be inclined forwards, a seat bottom lock for releasably locking the rear portion of said seat bottom to said floor so as to allow the forward rotation of said set bottom around said transverse axis when unlocked, a seat back lock for releasably locking said seat back to said seat bottom, and a lock releasing and linking mechanism for linking the forward inclination of said seat back and the rotation of said seat bottom to each other so as to conduct both seat back forward inclination and seat bottom rotation by a single operation.

2. An automobile seat as defined in claim 1 wherein said lock releasing and linking mechanism is provided with an actuation piece for detecting the rotation of said seat bottom and a drive member for releasing said seat back lock by the actuation of said actuation piece.

3. An automobile seat as defined in claim 2 wherein said seat back is rotatably mounted on a bracket mounted on said seat bottom, and said seat back lock is provided with a lock member for restraining the rotation of said seat back around the rotation axis on said bracket.

4. An automobile seat as defined in claim 3 wherein said actuation piece is mounted on the rear section of said seat bottom in such a manner that it is in contact with a member on said floor when said seat bottom is locked to said floor and separates from said member on said floor and releases said lock member of said seat back lock via said drive member when said seat bottom is rotated.

5. An automobile seat as defined in claim 4 wherein said actuation piece is urged to contact said floor member by a spring and said drive member essentially consists of a cable for connecting said actuation piece to said lock member.

6. An automobile seat as defined in claim 4 wherein said actuation piece is rotatably mounted on said seat bottom.

7. An automobile seat as defined in claim 3 wherein said actuation piece is rotatably mounted in the vicinity of a coupling section for rotatably coupling said seat bottom with said floor, said actuation piece being in contact with a member on said floor and rotated according to the rotation of said seat bottom.

8. An automobile seat as defined in claim 2 wherein said seat bottom lock is provided with a striker fixed to said floor and a lock piece mounted on said seat bottom for engagement with said striker.

9. An automobile seat as defined in claim 8 further comprising a seat bottom releasing lever for driving said lock piece.

10. An automobile seat as defined in claim 2 wherein said seat back is mounted on said seat bottom via a reclining mechanism for adjusting the angle of inclination of said seat back in a plurality of steps and said seat back lock is formed to releasably lock a knuckle bracket of said reclining mechanism to said seat back or said seat bottom, said knuckle bracket and said seat back or said seat bottom being rotatable with respect to each other.

11. An automobile seat as defined in claim 10 further comprising a seat bottom lock releasing and linking mechanism provided with an interlocking member for releasing said seat bottom lock in a manner interlocked with the forward inclination of said seat back effected by said reclining mechanism.

12. An automobile seat as defined in claim 1 wherein said lock releasing and linking mechanism is provided with an actuation piece for detecting the rotation of said seat bottom or the forward inclination of said seat back and a drive member for releasing said seat bottom lock or said seat back lock by the actuation of said actuation piece.

13. An automobile seat as defined in claim 12 wherein said lock releasing and linking mechanism is provided with said actuation piece for detecting the rotation of said seat bottom and said drive member for releasing said seat back lock by the actuation of said actuation piece.

14. An automobile seat as defined in claim 12 wherein said lock releasing and linking mechanism is a seat bottom lock releasing and linking mechanism provided with an interlocking member for releasing said seat bottom lock in a manner interlocked with the forward inclination of said seat back.

15. An automobile seat comprising a seat bottom rotatable around a transverse axis approximately parallel to a floor, a seat back mounted on said seat bottom so that the seat back can be inclined forwards, a seat bottom lock for releasably locking said seat bottom to said floor, a seat back lock for releasably locking said seat back to said seat bottom, and a lock releasing and linking mechanism for linking the forward inclination of said seat back and the rotation of said seat bottom to each other so as to conduct both seat back forward inclination and seat bottom rotation by a single operation wherein said lock releasing and linking mechanism is provided with an actuation piece for detecting the rotation of said seat bottom and a drive member for releasing said seat back lock by the actuation of said actuation piece.

16. An automobile seat as defined in claim 15 wherein said seat back is rotatably mounted on a bracket mounted on said seat bottom, and said seat back lock is provided with a lock member for restraining the rotation of said seat back around the rotation axis on said bracket.

17. An automobile seat as defined in claim 16 wherein said actuation piece is mounted on the rear section of said seat bottom in such a manner that it is in contact with a member on said floor when said seat bottom is locked to said floor and separates from said member on said floor and releases said lock member of said seat back lock via said drive member when said seat bottom is rotated.

18. An automobile seat as defined in claim 17 wherein said actuation piece is urged to contact said floor member by a spring and said drive member essentially consists of a cable for connecting said actuation piece to said lock member.

19. An automobile seat as defined in claim 17 wherein said actuation piece is rotatably mounted on said seat bottom.

20. An automobile seat as defined in claim 16 wherein said actuation piece is rotatably mounted in the vicinity of a coupling section for rotatably coupling said seat bottom with said floor, said actuation piece being in contact with a member on said floor and rotated according to the rotation of said seat bottom.

21. An automobile seat as defined in claim 15 wherein said seat bottom lock is provided with a striker fixed to said floor and a lock piece mounted on said seat bottom for engagement with said striker.

22. An automobile seat as defined in claim 21 further comprising a seat bottom releasing lever for driving said lock piece.

23. An automobile seat as defined in claim 15 wherein said seat back is mounted on said seat bottom via a reclining mechanism for adjusting the angle of inclination of said seat back in a plurality of steps and said seat back lock is formed to releasably lock a knuckle bracket of said reclining mechanism to said seat back or said seat bottom, said knuckle bracket and said seat back or said seat bottom being rotatable with respect to each other.

24. An automobile seat as defined in claim 23 further comprising a seat bottom lock releasing and linking mechanism provided with an interlocking member for releasing said seat bottom lock in a manner interlocked with the forward inclination of said seat back effected by said reclining mechanism.

25. An automobile seat as defined in claim 12 wherein said seat back is fixed to a bracket rotatably mounted on said seat bottom and said seat back lock governs the rotation of said bracket.

26. An automobile seat as defined in claim 25 wherein said seat bottom lock is provided with a striker fixed to said floor and a lock piece rotatably mounted on said seat bottom for engagement with said striker.

27. An automobile seat as defined in claim 26 wherein said seat bottom lock releasing and linking mechanism detects the rotation of said bracket and drives said lock piece.

* * * * *

UNITED STATES PATENT AND TRADEMARK OFFICE
CERTIFICATE OF CORRECTION

PATENT NO. : 4,484,776

DATED : November 27, 1984

INVENTOR(S) : Hiroyuki Gokimoto et al.

It is certified that error appears in the above-identified patent and that said Letters Patent is hereby corrected as shown below:

In the heading of the patent, [73] Assignee: , delete "Mazda Motor Corporation, Japan" and insert therefor -- Mazda Motor Corporation and Delta Kogyo Co., Ltd., both of Japan -- .

Signed and Sealed this

Twenty-seventh Day of August 1985

[SEAL]

Attest:

DONALD J. QUIGG

Attesting Officer

Acting Commissioner of Patents and Trademarks